US010997158B2

(12) United States Patent
Nayak et al.

(10) Patent No.: US 10,997,158 B2
(45) Date of Patent: May 4, 2021

(54) TECHNIQUES FOR UPDATING BIG DATA TABLES USING SNAPSHOT ISOLATION

(71) Applicant: Microsoft Technology Licensing, LLC, Redmond, WA (US)

(72) Inventors: Tapas Kumar Nayak, Redmond, WA (US); Amit Kumar Ghosh, Redmond, WA (US); Vineet Garhewal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 16/138,719

(22) Filed: Sep. 21, 2018

(65) Prior Publication Data

US 2020/0097580 A1 Mar. 26, 2020

(51) Int. Cl.
G06F 16/23 (2019.01)
G06F 16/907 (2019.01)
G06F 16/21 (2019.01)
G06F 16/11 (2019.01)

(52) U.S. Cl.
CPC ........ *G06F 16/2379* (2019.01); *G06F 16/128* (2019.01); *G06F 16/219* (2019.01); *G06F 16/2336* (2019.01); *G06F 16/907* (2019.01)

(58) Field of Classification Search
None
See application file for complete search history.

(56) References Cited

U.S. PATENT DOCUMENTS 7,644,106 B2 1/2010 Shankar et al.
7,756,831 B1 * 7/2010 Rao ..................... G06F 11/1471
707/638

(Continued)

FOREIGN PATENT DOCUMENTS

CN 102779080 A 11/2012

OTHER PUBLICATIONS

Microsoft: "Snapshot Isolation in SQL Server | Microsoft Does", Retrieved from https://docs.microsoft.com/en-us/dotnet/framework/data/adonet/sql/snapshot-isolation-in-sql-server, Oct. 25, 2019, 14 Pages.

(Continued)

*Primary Examiner* — Richard L Bowen
(74) *Attorney, Agent, or Firm* — Fiala & Weaver P.L.L.C.

(57) ABSTRACT

Methods, systems, and computer program products are described herein for updating big data tables using snapshot isolation. The tables may store data (e.g., as data objects) collected from different users. The tables are stored in a first data store. The data's metadata is stored in a second data store. The metadata comprises version numbers for the objects that correspond to a consistent version thereof. When an update process for the table is initiated, a coordinator locks the metadata, and. the objects are updated. If the update to the objects is successful, the coordinator commits the updates and obtains the new version numbers of the objects. If all the commits are successful, the coordinator atomically updates the metadata with the new version numbers and releases the lock. However, if a commit to an object is unsuccessful, a subsequent process rolls back the committed objects to the version numbers specified by the metadata.

20 Claims, 8 Drawing Sheets

(56) References Cited

U.S. PATENT DOCUMENTS

| | | | |
|---|---|---|---|
| 7,925,858 B2* | 4/2011 | Rao | G06F 11/1458 |
| | | | 711/170 |
| 9,130,821 B2 | 9/2015 | Rawat et al. | |
| 9,519,467 B2* | 12/2016 | Wang | G06F 9/3859 |
| 9,576,000 B2 | 2/2017 | Balmin et al. | |
| 9,632,828 B1* | 4/2017 | Mehta | H04L 12/00 |
| 9,799,017 B1* | 10/2017 | Vermeulen | G06F 16/25 |
| 9,852,146 B1* | 12/2017 | Bent | G06F 16/183 |
| 9,979,783 B2 | 5/2018 | Avati et al. | |
| 10,025,710 B2* | 7/2018 | Sardina | G06F 16/2343 |
| 10,725,775 B2* | 7/2020 | Suarez | G06F 8/71 |
| 2006/0136832 A1* | 6/2006 | Keller | G06F 3/0481 |
| | | | 715/765 |
| 2009/0037417 A1 | 2/2009 | Shankar et al. | |
| 2015/0278243 A1* | 10/2015 | Vincent | G06F 16/182 |
| | | | 707/634 |
| 2015/0278282 A1 | 10/2015 | Sardina et al. | |
| 2015/0310033 A1* | 10/2015 | Okabe | G06F 16/183 |
| | | | 707/827 |
| 2018/0121492 A1* | 5/2018 | Sawhney | G06F 16/2365 |
| 2018/0314706 A1* | 11/2018 | Sirton | G06F 16/1837 |
| 2020/0073964 A1* | 3/2020 | Levy | G06F 16/1865 |

OTHER PUBLICATIONS

"International Search Report and Written Opinion Issued in PCT Application No. PCT/US2019/039104", dated Nov. 5, 2019, 11 Pages.

"Determining the Data Model", Retrieved from: https://web.archive.org/web/20170811083350/https:/docs.citusdata.com/en/v6.2/sharding/data_modeling.html, Aug. 11, 2017, 10 Pages.

Corbett, et al., "Spanner: Google's Globally-Distributed Database", In Proceedings of 10th USENIX Symposium on Operating Systems Design and Implementation, Oct. 8, 2012, 14 Pages.

Mainali, et al., "Multi-Protocol Cloud Storage for Big Data and Analytics", Application as Filed in U.S. Appl. No. 16/018,650, filed Jun. 26, 2018, 103 Pages.

Paramasivam Balakrishnan, et al., "Efficient Snapshot Generation of Data Tables", Application as Filed in U.S. Appl. No. 15/497,022, filed Apr. 25, 2017, 35 Pages.

* cited by examiner

TECHNIQUES FOR UPDATING BIG DATA TABLES USING SNAPSHOT ISOLATION

BACKGROUND

The term "big data" is often used to describe large volumes (e.g., petabytes or exabytes) of data. Big data typically comprises a collection of demographic, psychographic, behavioral, and transactional data that companies collect with respect to their users. Such data may be utilized to better market goods and/or services. In certain instances, a user may be able to view the data that has been collected for him and modify (e.g., update or delete) certain data. However, updating such data can be very complex given the amount of data collected and the number of processes that may be actively accessing such data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for updating big data tables using snapshot isolation. The big data tables may store data (e.g., as files or other types of data objects) collected from a plurality of different users and/or applications. The big data tables may be stored in one or more first data stores. Metadata associated with the data may be stored in a separate (or second) data store(s). The metadata may comprise version numbers for each of the data objects that correspond to the last known, consistent version of the data objects. When a process to update a big data table is initiated, a coordinator locks the metadata, thereby preventing other processes from updating the metadata. Thereafter, the data objects are updated. If the update to each of the data objects is successful, the coordinator commits the updates to the data store in which the data objects are stored and obtains the new versions of the data objects. In the event that all the commits are successful, the coordinator atomically updates the metadata to include the new version numbers and releases the lock on the metadata. However, if at least one of the commits is unsuccessful, the process fails and the version numbers in the metadata are not updated. However, the lock on the metadata and the successful commits are maintained. When a subsequent process to update the data objects is initiated, the coordinator first determines whether another process maintains a lock on the metadata and whether that process is still active. In the event that such a lock is maintained and the other process has failed, the coordinator atomically revokes the lock and maintains a lock on the metadata on the behalf of the new process. The coordinator retrieves the last known, consistent version of the data objects from the metadata and, for each data object, compares the version number specified by the metadata to the version number of the data object stored in the first data store. If there is a difference in version number, the coordinator rolls back the version number of the data object to the version number specified by last known, consistent version number. Thereafter, the subsequent process performs the update to the data objects.

Accordingly, the version number specified by the metadata serves as an isolated snapshot of the data objects, which represents a consistent version of the data objects, as the version number is only updated when each data object is updated and committed successfully. Read processes configured to read the data objects only reference the version numbers specified by the metadata to determine which version of the data object to read. This ensures that read processes read from a consistent snapshot of the data objects stored in the data store, and not an old or corrupted version of the data objects.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
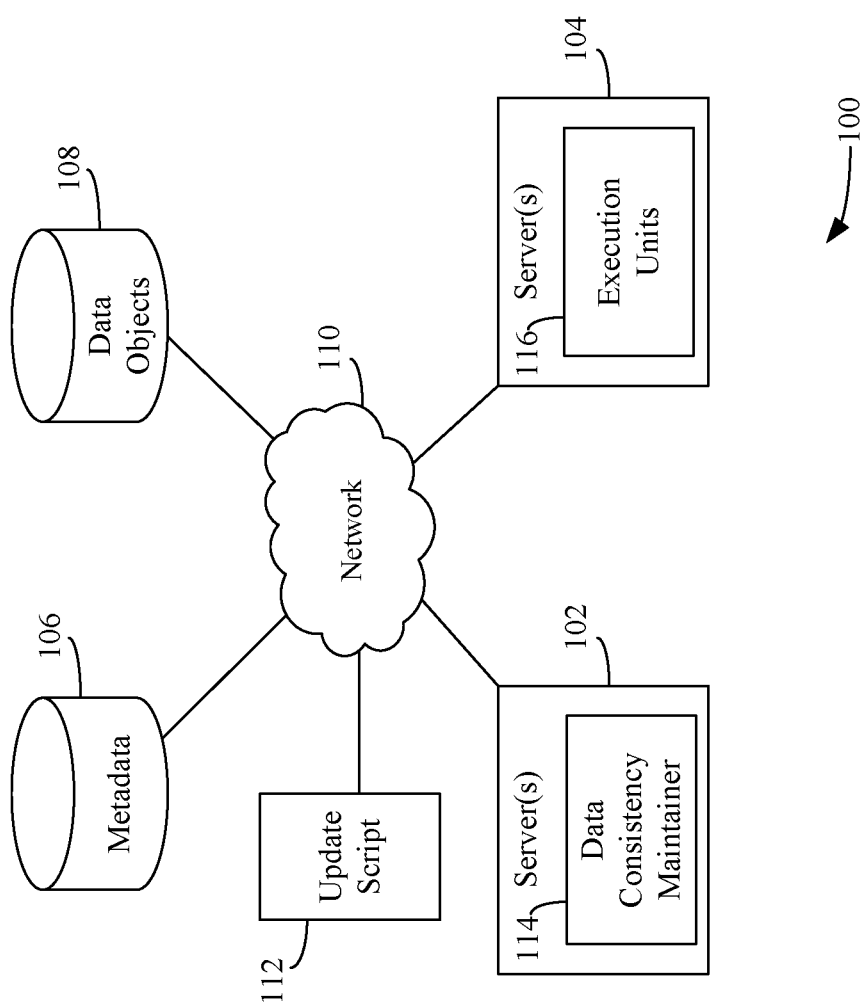
FIG. 1 is a block diagram of an example system for updating data while maintaining data consistency in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Updating Big Data Tables Using Snapshot Isolation Examples are described herein for updating big data tables using snapshot isolation. The big data tables may store data (e.g., as data objects or files) collected from a plurality of different users and/or applications. The big data tables may be stored in one or more first data stores. Metadata associated with the data may be stored in a separate (or second) data store(s). The metadata may comprise version numbers for each of the data objects that correspond to the last known, consistent version of the data objects. When a process to update a big data table is initiated, a coordinator locks the metadata, thereby preventing other processes from updating the metadata. Thereafter, the data objects are updated. If the update to each of the data objects is successful, the coordinator commits the updates to the data store in which the data objects are stored and obtains the new versions of the data objects. In the event that all the commits are successful, the coordinator atomically updates the metadata to include the new version numbers and releases the lock on the metadata. However, if at least one of the commits is unsuccessful, the process fails and the version numbers in the metadata are not updated. However, the lock on the metadata and the successful commits are maintained. When a subsequent process to update the data objects is initiated, the coordinator first determines whether another process maintains a lock on the metadata and whether that process is still active. In the event that such a lock is maintained and the other process has failed, the coordinator atomically revokes the lock and maintains a lock on the metadata on the behalf of the new process. The coordinator retrieves the last known, consistent version of the data objects from the metadata and, for each data object, compares the version number specified by the metadata to the version number of the data object stored in the first data store. If there is a difference in version number, the coordinator rolls back the version number of the data object to the version number specified by last known, consistent version number. Thereafter, the subsequent process performs the update to the data objects.

Accordingly, the version number specified by the metadata serves as an isolated snapshot of the data objects, which represents a consistent version of the data objects, as the version number is only updated when each data object is updated and committed successfully. Read processes configured to read the data objects only reference the version numbers specified by the metadata to determine which version of the data object to read. This ensures that read processes read from a consistent snapshot of the data objects stored in the data store, and not an old or corrupted version of the data objects.

By preventing processes from reading inconsistent data, compute-intensive processes for recovering the correct data is prevented. For example, the alternative to utilizing the update and recovery processes described herein to maintain data consistency would require computing resource-intensive processes, where an enormous amount of audit logs would be required to keep track of every single transaction performed with respect to each of the data objects (which can easily range in the millions or billions). Maintaining these audit logs requires a large amount of storage. Moreover, analyzing the audit logs to determine which data objects are inconsistent and how those data objects became inconsistent would require an immense amount of computing power given the amount of audit logs.

FIG. 1 shows a block diagram of an example system 100 for updating data while maintaining data consistency, according to an example embodiment. As shown in FIG. 1, system 100 includes one or more first servers 102, one or more second servers 104, a metadata store 106 and a data object store 108. Each of first server(s) 102, second server(s) 104, metadata store 106 and data object store 108 may be communicatively connected to each other via a network 110. Network 110 may comprise one or more networks such as local area networks (LANs), wide area networks (WANs), enterprise networks, the Internet, etc., and may include one or more of wired and/or wireless portions. First server(s) 102, second server(s) 104, metadata store 106 and/or data object store 108 may be included in a cloud platform/architecture (i.e., a cloud-based environment). A cloud platform includes a networked set of computing resources, including servers (e.g., first server(s) 102, second server(s) 104), storage (e.g., metadata store 106 and data object store 108), routers, etc., that are configurable, shareable, provide data security, data warehousing services, etc., and are accessible over a network (e.g., network 110) such as the Internet.

Data object store 108 may comprise one or more mutable data stores or databases configured to store data associated with a plurality of users (also referred to as "big data"). The data may be stored as data objects (e.g., a data file, a database object (e.g., a table, a directory, etc.), structured data, unstructured data, semi-structured data, a data container, etc.). The data stored by data object store 108 may comprise different items of information, such as, but not limited to, demographic information (e.g., age, gender, location, etc.) associated with each of the plurality of users, a usage history associated with one or more devices and/or software applications associated with each of the plurality of users, purchase activity associated with each of the plurality of users (e.g., device purchases, software application purchases, etc.), advertising campaigns associated with each of the plurality of users (e.g., advertisements that have been targeted to each of the plurality of users, advertisements that have been interacted with (e.g., viewed, clicked on, etc.) by each of the plurality of users, etc. Such data may be collected from various types of applications (e.g., social media applications and/or websites, retail applications and/or websites, etc.). Data object store 108 may store multiple days', weeks', months', and/or years' worth of such data. The data objects may be logically represented as one or more tables (e.g., big data tables). Each table comprises a plurality of rows and columns. Each data object may be represented by one or more columns of a particular row.

Data object store 108 may be a versioned data store, which stores multiple versions of the data objects stored therein. Each version of a particular data object may be associated with a corresponding version number. In accordance with an embodiment, data object store 108 may store the last two versions of each of the data objects (e.g., the latest version (as obtained via an update, as described below), and the last known, consistent version of the data object (as also described below). This limits the amount of data objects stored in data object store 108, thus, advantageously conserving storage. In accordance with an embodiment, the last know consistent version may comprise the entire physical data object, and the latest version may comprise only the changes (or deltas) between the two versions, thereby conserving even more storage. Alternatively, each version may comprise the entire physical data object.

Metadata store 106 may comprise one or more mutable data store or databases that store metadata for each of the data objects stored in data store 108. The metadata associated with a particular data object may include an identification of where the data object is located (e.g., an identifier of the table(s) stored in data object store 108 in which the data object is located, the row number(s) of those table(s), column number(s) of those table(s), etc.) and the current (or latest) version number of the data object. The current version number of a data object represents the version number of the last known, consistent version of the data object. As will be described below, the metadata may also include an identifier that identifies whether a table storing a data object in data object store 108 is locked or unlocked. The metadata may be stored in one or more tables maintained by metadata store 106.

As also shown in FIG. 1, first server(s) 102 includes a data consistency maintainer 114. Data consistency maintainer 114 is configured to receive update requests for updating data object(s) stored in data object store 108 and facilitate the updates to the data object(s). For example, when a user desires to update data stored in data object store 108 (e.g., to modify and/or delete data), the user may interact with a graphical user interface provided by the application and select the data that is to be updated. Based on the user's input, the application may generate an update script (e.g., update script 112) that identifies the data to be updated, the manner in which the data is to be updated, and/or the operations (e.g., data transformations) to be performed on the data. Update script 112 may be comprised of data query language statements, data definition language statements, data control language statements, data manipulation language statements, and/or other statements and/or code (e.g., custom code). Update script 112 is provided to data consistency maintainer 114, e.g., via network 110. Data consistency maintainer 114 may be configured to receive a plurality of different update scripts from a plurality of different users and/or applications.

Upon receiving update script 112, data consistency maintainer 114 may allocate a particular number of execution units 116 maintained by second server(s) 104 to perform the update based on the number of data objects to be updated. Each of execution units 116 may comprise a particular number of compute resources, such as, but not limited to, a particular number of central processing unit(s) (CPUs) or processor cores and a particular amount of memory (e.g., 2 GB of memory, 4 GB of memory, etc.).

When an update is being performed, data consistency maintainer 114 ensures that data consistency is maintained in the event that an update fails, thereby allowing other processes configured to read such data to read the data without the risk of reading old or corrupted data. The foregoing may be achieved using snapshot isolation, which ensures that read processes read from a consistent snapshot of the data objects stored in data object store 108. For example, when reading data object(s), such processes may utilize the last known, consistent version numbers stored in metadata store 106 to read the data object(s) stored in data object store 108. Additional details regarding the foregoing techniques are described below with reference to FIG. 2.

Figure 2:
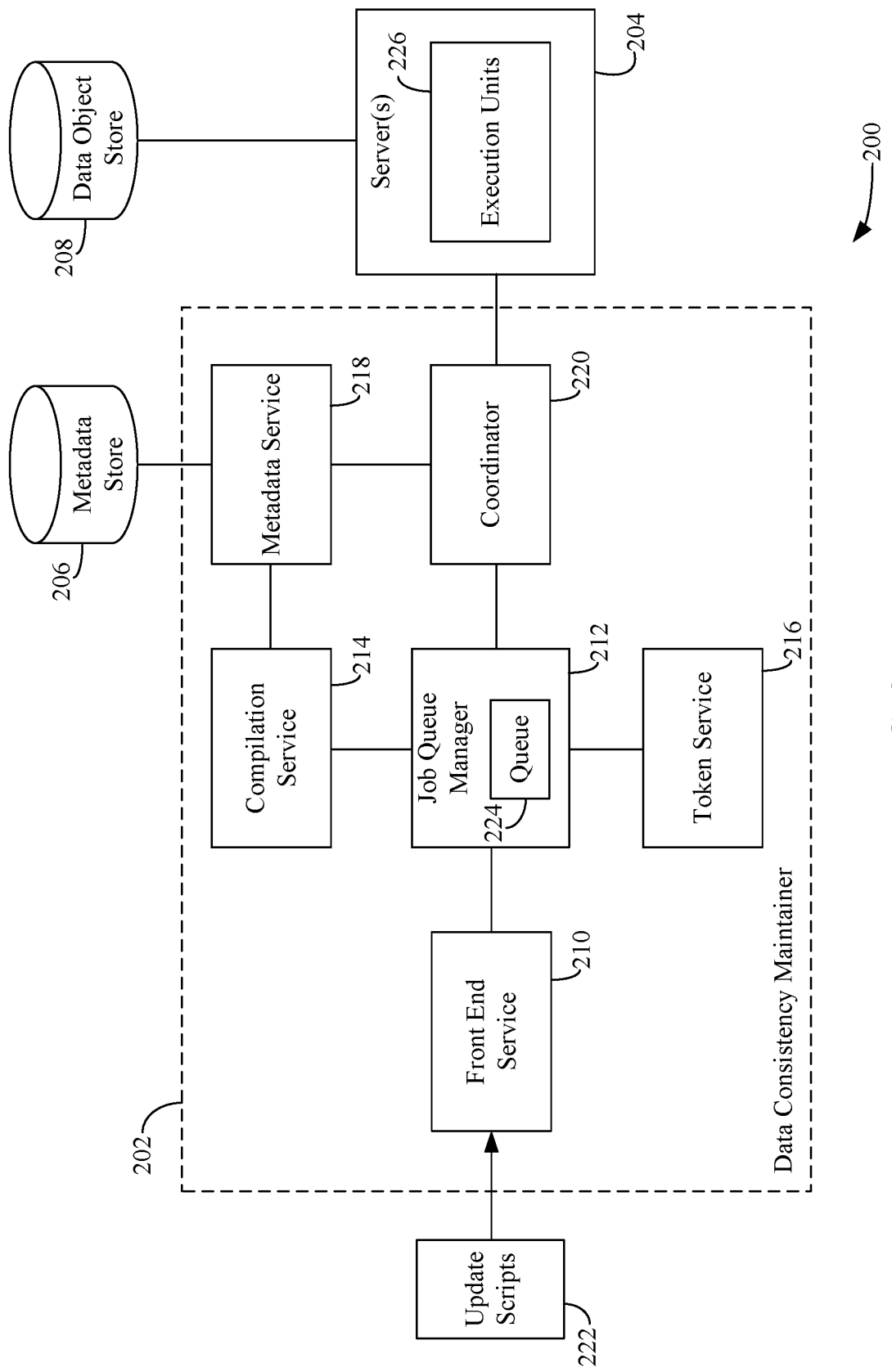
FIG. 2 is a block diagram of an example system for updating data while maintaining data consistency in accordance with another embodiment.

For example, FIG. 2 shows a block diagram of an example system 200 for updating data while maintaining data consistency, according to another example embodiment. As shown in FIG. 2, system 200 includes a data consistency maintainer 202, server(s) 204, a metadata store 206, and a data object store 208. Data consistency maintainer 202 is an example of data consistency maintainer 114, server(s) 204 are an example of server(s) 104, metadata store 206 is an example of metadata store 106, and data object store 208 is an example of data object store 108, as respectively described above with reference to FIG. 1. As shown in FIG. 2, data consistency maintainer 202 comprises a front end service 210, a job queue manager 212, a compilation service 214, a token service 216, a metadata service 218, and a coordinator 220. Server(s) 204 comprise execution units 226, which are examples of execution units 116, as respectively described above with reference to FIG. 1.

Front end service 210 is configured to receive one or more update scripts 222. Update scripts 222 are an example of update script 112, as described above with reference to FIG. 1. For example, front end service 210 may comprise one or more application programming interfaces (APIs) for receiving update scripts 222 from a plurality of difference users and/or applications. For example, an application may provide an update script via an API call to the APIs of front end service 210. Front end service 210 provides update scripts 222 to job queue manager 212.

Job queue manager 212 may comprise a queue 224. Job queue manager 212 may submit update scripts 222 to queue 224 in the order that they were received. Each of update scripts 222 submitted to queue 224 represents an update process (or job) that is configured to update data stored in data object store 208 in accordance with the update script. Each entry in queue 224 may store an identifier of the process and a status of the corresponding process. For example, the status may indicate whether the process is active (e.g., currently executing), failed or inactive (e.g., due to an update failure), pending (i.e., waiting to be executed), terminated, etc.

When a process in queue 224 is ready for execution, job queue manager 212 provides the corresponding update script to compilation service 214. Compilation service 214 is configured to compile the update script into a format suitable for execution by execution units 226. During the compilation process, compilation service 214 queries metadata service 218. Metadata service 218 is configured to retrieve the metadata associated with the data objects to be updated from table(s) stored in metadata store 206. For instance, metadata service 218 may provide a query to metadata store 206 that identifies the data to be updated. In response, metadata store 206 may return how the data object(s) are logically and/or physically stored in data object store 208. For example, the metadata may specify the table(s) in which the data object(s) are located, the row(s) and/or column(s) in which the data object(s) are stored in those table(s), etc. Metadata service 218 provides the metadata to compilation service 214

Job queue manager 212 may also provide a query to token service 216. Token service 216 may specify the amount of execution units 226 that are available for a particular user. For example, in an embodiment in which data consistency maintainer 202 is executing in a cloud-based environment, a user may sign up for a subscription with a provider of the cloud-based environment (i.e., a cloud-based provider). When signing-up, the user may purchase a certain amount of execution units 226 that can be utilized for various tasks, including updating data stored in data object store 208. Token service 216 specifies the amount of execution units 226 that are available to the user and returns a number of tokens representing the number of available execution units 226 to job queue manager 212. Job queue manager 212 may provide the tokens to compilation service 214.

Based on the metadata received from metadata service 218 and the tokens received via token service 216, compilation service 214 determines an execution plan for executing the update script. The execution plan may be divided into a number of tasks (also referred to as a "vertex"). Each of update scripts 222 may correspond to any number of vertices, including tens, hundreds, and even thousands of vertices. The execution plan may specify the order in which each vertex is to be executed and the number of execution units 226 that are to be used when executing each vertex. When the vertex is finished, execution units 226 allocated for that vertex may be allocated to another vertex. In this manner, the job or process is completed vertex-by-vertex. It is noted that multiple vertices can be executed at the same time, thus multiple execution units 226 may be in use at the same time. When the job is finished, all execution units 226 utilized for the job are released for use by other jobs. The determined execution plan may be provided to coordinator 220. Coordinator 220 is configured to allocate execution units 226 in accordance with the execution plan.

To perform an update to data objects stored in data object store 208 for a process maintained by queue 224, coordinator 220 may initially obtain and maintain a lock on metadata table(s) in metadata store 206 storing the metadata for such data object(s) on behalf of the queued process. This prevents other processes from modifying the metadata. After locking the table(s) in metadata store 206, coordinator 220 may send a query to metadata service 218 that requests the current version numbers of the data object(s) to be updated. In response to receiving the query, metadata service 218 obtains the current version numbers from metadata store 206 and provides the current version numbers to coordinator 220. After retrieving the current version numbers, coordinator 220 opens each of the data objects to be updated stored in data object store 208. For example, coordinator 220 may issue an open command that specifies the data objects to be opened to data object store 208. In response, data object store 208 returns the object handles (e.g., file handles) for each of the opened data objects to coordinator 220. Coordinator 220 provides the object handles to execution units 226 allocated for the update, and execution units 226 perform the updates to the opened data objects identified by the object handles. After each successful update to a particular data object, the execution unit that performs the update sends an indicator to coordinator 220 that indicates that the update has completed successfully. In the event that the execution unit does not successfully update a particular data object, the execution unit sends an indicator to coordinator 220 that indicates that the update was not successful. In response to an unsuccessful update, coordinator 220 may allocate a new execution unit of execution units 226 to perform the update, obtain a new object handle for the unsuccessfully updated data object (e.g., by issuing a new open command to data object store 208), and provides the newly-obtained object handle for the unsuccessfully updated data object to the newly-allocated execution unit.

Coordinator 220 determines whether each of the execution units have successfully updated the data object for which it was tasked to update. For example, coordinator 220 may determine whether each indication received from execution units 226 indicates that the update was performed successfully. In response to determining that all execution units 226 have successfully updated the data objects, coordinator 220 individually commits (i.e., permanently saves) each of the updated data objects. When an updated data object has been committed, the version number of that data object is updated (e.g., the version number is sequentially incremented). Data object store 208 provides the updated version number for each of the updated data objects to coordinator 220 (e.g., responsive to an API call issued by coordinator 220 that requests the updated version number). Upon receiving the updated version numbers for each of the updated data objects, coordinator 220 updates the corresponding metadata stored in metadata store 206 with the updated version numbers. For example, coordinator 220 may send a command to metadata service 218 that identifies the data objects and the updated version numbers for those data objects. Metadata service 218 may update the metadata stored in metadata store 206 for the identified data objects. Metadata service 218 may update the metadata for each of the updated data objects with the updated version numbers atomically to ensure that all the version numbers are updated. This advantageously ensures that metadata store 206 remains in a consistent state. After metadata store 206 has been updated, coordinator 220 releases the lock on metadata store 206, thereby enabling other processes to perform updates.

In accordance with an embodiment, before releasing the lock, coordinator 220 may determine whether the lock is still maintained. In certain situations, another process may illegally obtain a lock on a table maintained by metadata store 206. For example, another process may query metadata store 206 (via metadata service 218) to determine whether a lock is maintained on certain data objects. When a lock is maintained, metadata service 218 sends a response indicating as such. However, the response may become corrupted (e.g., due to network and/or transmission errors). The corrupted response may inadvertently indicate that the lock owner process (i.e., the original process) is no longer active, and the other process may obtain the lock, thereby causing the original process to lose the lock. In the event that coordinator 220 determines that the original process no longer maintains the lock, coordinator 220 may cause an error message to be issued (e.g., to an administrator of system 200). As described below, a subsequent process may perform a recovery process to rollback the committed data objects to valid version number.

If at least one commit of a particular data object fails (e.g., due to coordinator 220 crashing), job queue manager 212 sets the status of the process as failed (or inactive). However, the lock maintained on metadata store 206 on behalf of the process and the successful commits to other data objects are maintained (i.e., the lock maintained on behalf of the failed process is maintained). However, because all the data object were not successfully committed, coordinator 220 does not update the version numbers maintained in the metadata. Accordingly, the metadata stores a consistent version of the version numbers.

Because each of the data objects were not successfully updated, the data stored in data object store 208 are in an inconsistent state. In particular, certain data objects stored therein may have been updated (and therefore have an updated version number), and other data objects have not been updated. Accordingly, a recovery process is performed to return data object store 208 to a consistent state. As described above, data object store 208 stores a plurality of different versions of each of the data objects stored therein (e.g., the latest version (as obtained via an update), and the last known consistent version). In accordance with an embodiment, a subsequent process configured to update the data objects may perform the recovery process before updating the data objects. The recovery process is configured to rollback the committed data objects to the last known consistent version of the data object. As described above, the last known consistent version is specified by the metadata for that data object. For example, when a subsequent (or second) process maintained by queue 224 is ready for execution, coordinator 220 may first determine whether a lock is maintained on behalf of another (or prior) process. For example, coordinator 220 may send a query to metadata service 218. The query requests the metadata that specifies whether or not a lock maintained on a metadata table associated with the data objects to be updated. Metadata service 218 returns such metadata to coordinator 220. If the metadata specifies that a lock is maintained on behalf of another process, coordinator 220 determines whether that process is still active. For example, coordinator 220 may access queue 224 and determine the status of that process. If the status indicates that the process is currently running, coordinator 220 suspends the second process until the other process finishes execution. However, if the status indicates that other process is failed (or inactive), coordinator 220 releases the lock maintained on behalf of the failed process and obtains and maintains a lock on the metadata table on behalf of the second process.

After obtaining and maintaining the lock, coordinator 220 obtains the current version numbers of the data objects to be obtained from metadata store 206 (e.g., via metadata service 218). For each of the data objects, coordinator 220 compares the version number specified by the metadata retrieved from metadata store 206 to the version number specified by data object store 208. If the version numbers do not match (e.g., the version number specified by data object store 208 is greater than the version number specified by the metadata), coordinator 220 performs a rollback process that restores the data object stored in data object store 208 to the version specified by the metadata. If the version numbers match, coordinator 220 maintains the data object in data object store 208 (i.e., coordinator 220 does not perform a rollback process for that data object). After the rollback process is complete, the process performs the update to the data objects in a similar manner as described above.

Read processes (e.g., executing before, after or during an update process) may utilize the current, consistent version numbers from metadata store 206 when reading data object(s) from data object store 208. Because the version numbers stored in metadata store 206 are only updated after all data objects are updated and committed (via an update process, as described above), read processes are guaranteed to read a consistent version of the data objects from data object store 208.

Figure 3:
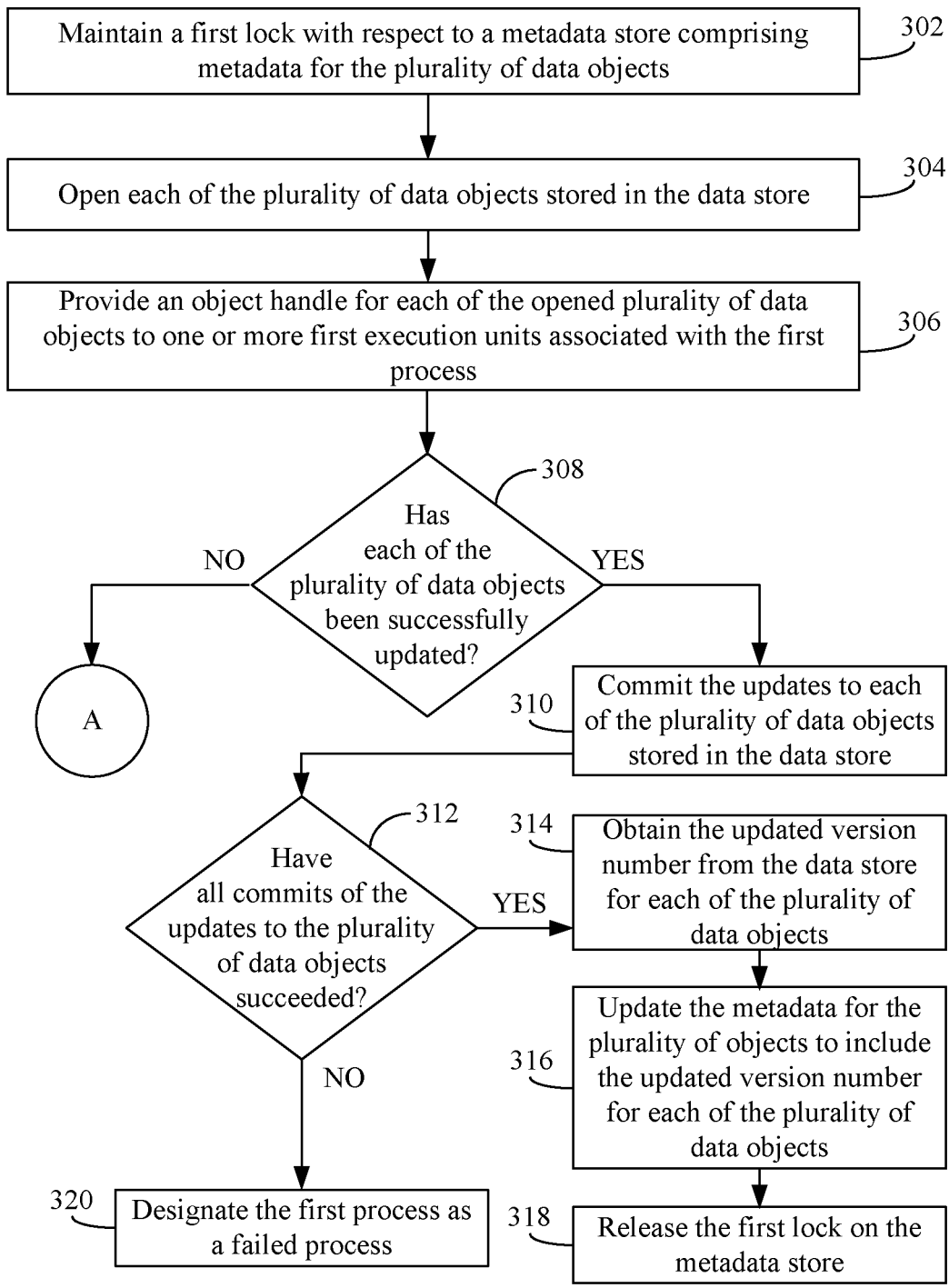
FIG. 3 depicts a flowchart of an example process for updating data while maintaining data consistency in accordance with an example embodiment.
Figure 4:
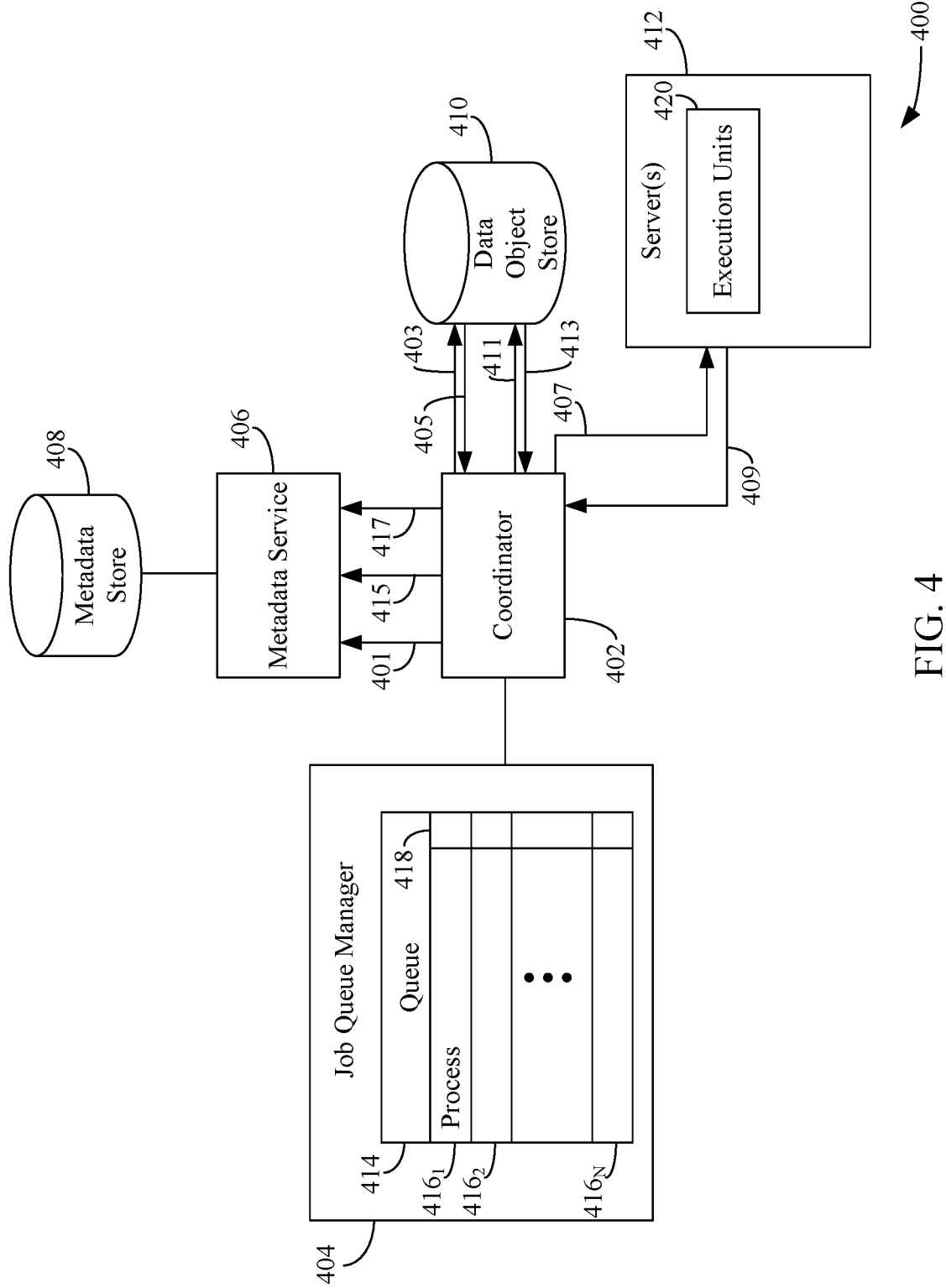
FIG. 4 is a block diagram of an example system for updating data while maintaining data consistency in accordance with yet another embodiment.

Accordingly, data may be updated while maintained data consistency in many ways. For example, FIG. 3 depicts a flowchart 300 of an example process for updating data while maintaining data consistency in accordance with an example embodiment. The method of flowchart 300 will now be described with reference to FIG. 4, although the method is not limited to the implementation depicted therein. FIG. 4 is a block diagram of system 400 for updating data while maintaining data consistency in accordance with another example embodiment. As shown in FIG. 4, system 400 includes a coordinator 402, a job queue manager 404, a metadata service 406, a metadata store 408, a data object store 410, and server(s) 412. Coordinator 402, job queue manager 404, metadata service 406, metadata store 408, data object store 410, and server(s) 412 are examples of coordinator 220, job queue manager 212, metadata service 218, metadata store 206, data object store 208, and server(s) 204, as described above with reference to FIG. 2. Job queue manager 404 comprises a queue 414, which is an example of queue 224, as described above with reference to FIG. 2. As shown in FIG. 4, server(s) 412 comprise execution units 420, which are examples of execution units 226, as described above with reference to FIG. 2. As further shown in FIG. 4, queue 414 comprises a plurality of entries $416_1$-$416_N$. Each entry of entries $416_1$-$416_N$ is configured to store a job or process corresponding to an update script received from a user and/or application. Each entry of entries $416_1$-$416_N$ may also comprise a status field 418, which stores the status of the corresponding job or process (e.g., active, failed, pending, terminated, etc.). As shown in FIG. 4, queue 414 stores an identifier of a first process in entry $416_1$. Other structural and operational embodiments will be apparent to persons skilled in the relevant art(s) based on the discussion regarding flowchart 300 and system 400.

As shown in FIG. 3, the method of flowchart 300 begins at step 302, in which a first lock is maintained with respect to a metadata store comprising metadata for a plurality of data objects. The metadata specifies a version number for each of the plurality of data objects, and the first lock is maintained on behalf of a first process configured to update the plurality of data objects. For example, with reference to FIG. 4, coordinator 402 maintains a lock with respect to metadata store 408. For instance, the lock is maintained on a metadata table stored in metadata store 408 that stores the metadata for the plurality of data objects. The lock is maintained on behalf of the process stored in entry $416_1$. Coordinator 402 may provide a request 401 to metadata service 406 to lock the metadata table, and metadata service 406 locks the metadata table stored in metadata store 408 in response.

At step 304, each of the plurality of data objects stored in the data store are opened. For example, with reference to FIG. 4, coordinator 402 may send a request 403 to data object store 410 to open each of the data objects that are to be updated.

At step 306, an object handle for each of the opened plurality of data objects is provided to one or more first execution units associated with the first process. For example, with reference to FIG. 4, data object store 410 may provide the object handle for each of the opened data objects to coordinator 402 via a response 405. Coordinator 402 provides the object handles to execution units 420 that have been allocated by coordinator 402 for the process via a request 407.

In accordance with one or more embodiments, each of the one or more first execution units comprises at least one of one or more processors or memory.

At step 308, a determination is made as to whether each of the plurality of data objects have been successfully updated by the one or more first execution units. For example, with reference to FIG. 4, coordinator 402 determines whether each of the plurality of data objects stored in data object store 410 have been successfully updated by execution units 420. For instance, for each of the data objects being updated, an execution unit of execution units 420 configured to update the data object may provide an indicator to coordinator 402 that indicates whether the data object has been successfully updated.

If a determination is made that at least one of the plurality of data objects has not been successfully updated, flow continues to step 502 of FIG. 5, which is described below. Otherwise, flow continues to step 310.

At step 310, the updates to each of the plurality of data objects stored in the data store are committed in response to determining that all of the plurality of data objects have been successfully updated. For example, with reference to FIG. 4, coordinator 402 sends a command 411 to data object store 410 that causes data object store 410 to individually commit the updates to the data objects. Coordinator 402 may send a command 411 for each of the updated data objects that are to be committed.

At step 312, a determination is made as to whether all commits of the updates to the plurality of data objects have succeeded. A successful commit of an update to a data object of the plurality of data objects causes a version number for that data object specified in the data store to be updated. For example, coordinator 402 determines whether all commits of the update to the plurality of data objects have succeeded. If a determination is made that a commit of the update to at least one of the plurality of data objects has failed, flow continues to step 320. Otherwise, flow continues to step 314.

At step 314, an updated version number for each of the plurality of data objects is obtained. For example, with reference to FIG. 4, after a data object is committed, data object store 410 may provide a response 413 to coordinator 402 that includes the updated version number for that data object.

At step 316, the metadata for the plurality of objects is updated to include the updated version number for each of the plurality of data objects. For example, with reference to FIG. 4, coordinator 402 may provide a request 415 to metadata service 406 to update each of the version numbers stored in metadata store 408 for the updated data objects. Request 415 may cause all of the version numbers to be updated in an atomic fashion to guarantee that all of the version numbers are updated (and not a subset of the version numbers). The version numbers are updated while the first lock is maintained with respect to the metadata store in accordance with step 302 described above.

At step 318, the first lock on the metadata store is released. For example, with reference to FIG. 4, coordinator 402 sends a command 417 to metadata service 406 to release the lock on the metadata table stored in metadata store 408 maintained on behalf of the first process.

In accordance with one or more embodiments, releasing the first lock comprises determining whether the first lock is maintained. For example, with reference to FIG. 4, coordinator 402 may send a query to metadata service 406 to determine whether the first lock is maintained on behalf of the first process. In response to determining that the first lock is no longer maintained, an error message is caused to be issued (e.g., to an administrator). For example, with reference to FIG. 4, coordinator 402 may cause an error message to be issued. In response to determining that the first lock is still maintained, the first lock is released. For example, as described above, coordinator 402 sends command 417 to metadata service 406 to release the lock on the metadata table stored in metadata store 408 maintained on behalf of the first process.

At step 320, the first process is designated as a failed process in response to determining that a commit of the update to at least one of the plurality of data objects has failed. For example, with reference to FIG. 4, job queue manager 404 may change the status in status field 418 of the first process to failed.

In accordance with one or more embodiments, the first lock on the metadata store and successful commits to corresponding data objects of the plurality of data objects are maintained in response to the commit of the update to the at least one of the plurality of data objects failing.

Figure 5:
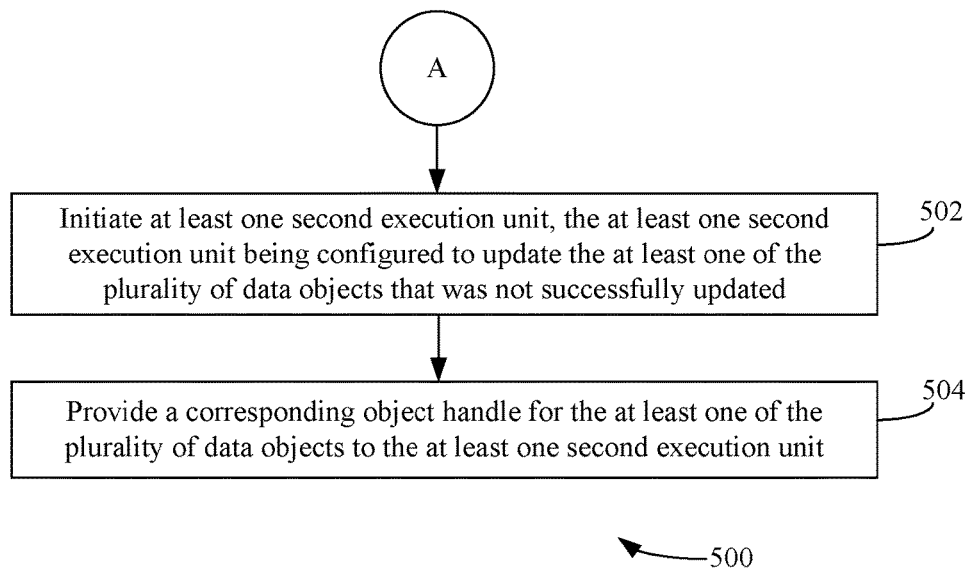
FIG. 5 depicts a flowchart of an example process for re-initiating an update to a data object in response to a failed update thereof in accordance with an example embodiment.
Figure 6:
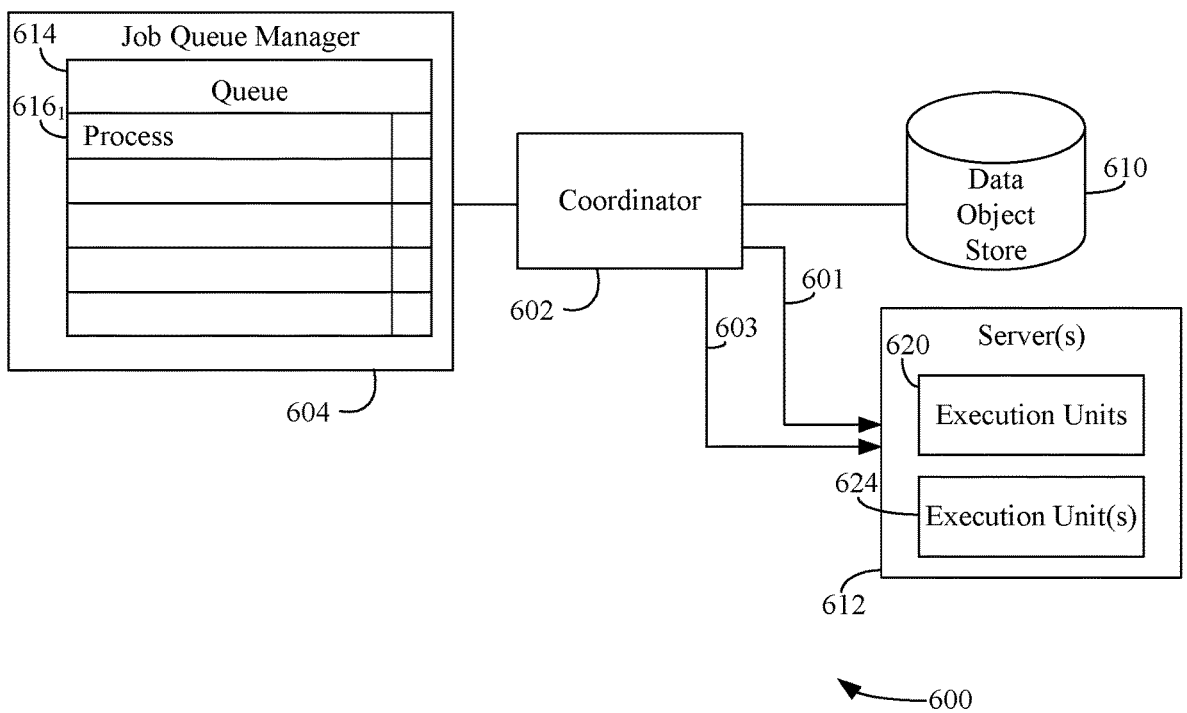
FIG. 6 is a block diagram of an example system for re-initiating an update to a data object in response to a failed update thereof in accordance with an example embodiment.

FIG. 5 depicts a flowchart 500 of an example process for re-initiating an update to a data object in response to a failed update thereof in accordance with an example embodiment. The method of flowchart 500 will now be described with reference to FIG. 6, although the method is not limited to the implementation depicted therein. FIG. 6 is a block diagram of system 600 for re-initiating an update to a data object in response to a failed update thereof in accordance with another example embodiment. As shown in FIG. 6, system 600 includes a coordinator 602, a job queue manager 604, a data object store 610, and server(s) 612. Coordinator 602, job queue manager 604, data object store 610, and server(s) 612 are examples of coordinator 402, job queue manager 412, data object store 410, and server(s) 412, as respectively described above with reference to FIG. 4. Job queue manager 604 comprises a job queue 614, which is an example of job queue 414, as described above with reference to FIG. 4. As shown in FIG. 6, server(s) 612 comprise execution units 620, which are examples of execution units 420, as described above with reference to FIG. 4. As shown in FIG. 6, queue 614 stores an identifier of the first process in entry 616$_1$. Other structural and operational embodiments will be apparent to persons skilled in the relevant art(s) based on the discussion regarding flowchart 500 and system 600.

As shown in FIG. 5, the method of flowchart 500 begins at step 502, in which a at least one second execution unit is initiated. The at least one second execution unit is configured to update the at least one of the plurality of data objects that was not successfully updated. For example, with reference to FIG. 6, coordinator 602 may send a command 601 to server(s) 612 that causes server(s) 612 to allocate one or more second execution units 624.

At step 504, a corresponding object handle for the at least one of the plurality of data objects is provided to the at least one second execution unit. For example, with reference to FIG. 6, coordinator 602 provides the object handle to second execution unit(s) 624 via a request 603. The object handle may be obtained by issuing a new request to data object store 610 to open the at least one of the plurality of data objects and receiving a response from data object store 610 that specifies the object handle for the opened at least one of the plurality of data objects in a similar manner as described above with reference to FIG. 4. Second execution unit(s) 624 attempt to update the data object as identified by the object handle. If second execution unit(s) 624 are successful in updating the data object, and all other data objects were successfully updated, coordinator 602 commits the updates to the plurality of data objects, obtains an updated version number of the updated, updates the metadata for the updated data objects in metadata store (e.g., metadata store 408, as described above with reference to FIG. 4), and releases the lock on the metadata store in accordance with steps 310, 314, 316 and 318 as described above with reference to FIG. 3.

Figure 7:
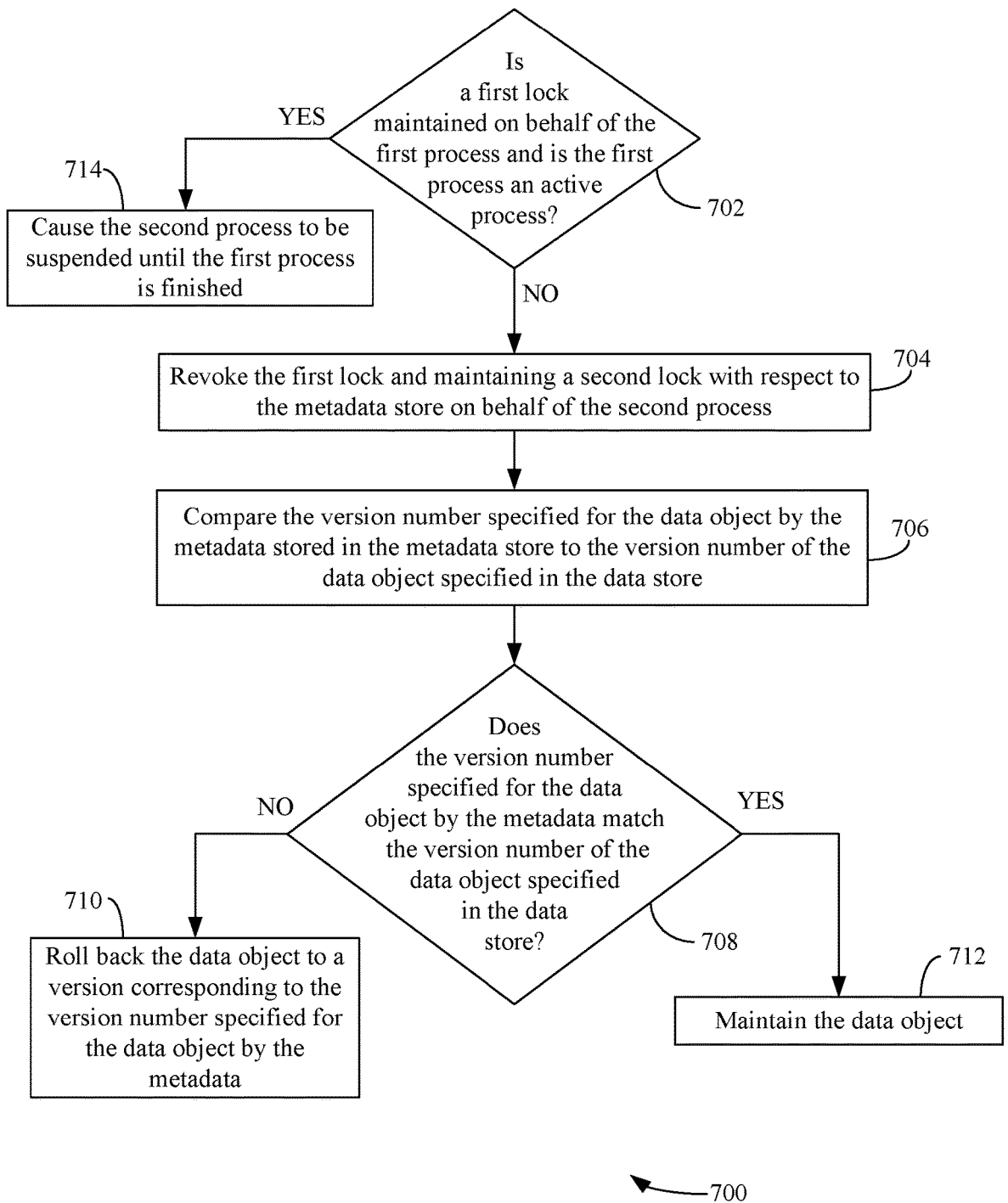
FIG. 7 depicts a flowchart of an example recovery process for rolling back data objects to a consistent version number in accordance with an example embodiment.
Figure 8:
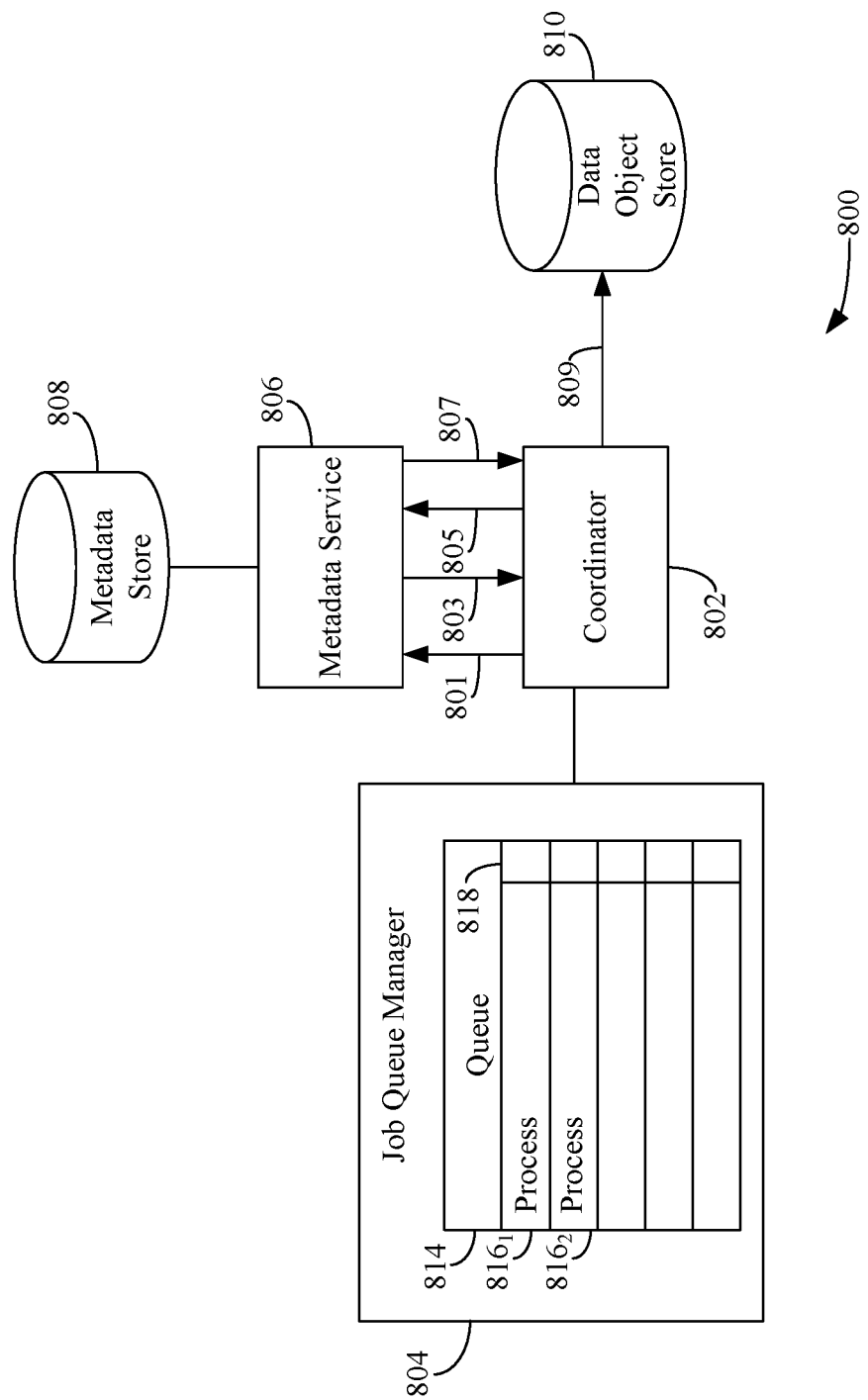
FIG. 8 is a block diagram of an example system for rolling back data objects to a consistent version number in accordance with an example embodiment.

FIG. 7 depicts a flowchart 700 of an example recovery process for rolling back data objects to a consistent version number in accordance with an example embodiment. The method of flowchart 700 will now be described with reference to FIG. 8, although the method is not limited to the implementation depicted therein. FIG. 8 is a block diagram of system 800 for rolling back data objects to a consistent version number in accordance with another example embodiment. As shown in FIG. 8, system 800 includes a coordinator 802, a job queue manager 804, a metadata service 806, a metadata store 808, and a data object store 810. Coordinator 802, job queue manager 804, and data object store 810 are examples of coordinator 602, job queue manager 604, and data object store 610, as respectively described above with reference to FIG. 6, and metadata service 806 and metadata store 808 are examples of metadata service 406, and metadata store 408, as described above with reference to FIG. 4. Job queue manager 804 comprises a queue 814, which is an example of queue 614, as described above with reference to FIG. 6. As shown in FIG. 8, queue 814 stores an identifier of the first process in entry $816_1$ and stores a second process in entry $816_2$. The status field of the first process may indicate that the first process in a failed process in accordance with step 320, as described above with reference to FIG. 3. Other structural and operational embodiments will be apparent to persons skilled in the relevant art(s) based on the discussion regarding flowchart 700 and system 800.

As shown in FIG. 7, the method of flowchart 700 begins at step 702, in which a determination is made as to whether the first lock is maintained on behalf of the first process and whether the first process is an active process or a failed process responsive to an initiation of a second process configured to update the plurality of data objects. For example, with reference to FIG. 8, coordinator 802 may determine whether the first lock is maintained on behalf of the first process and whether the first process is an active process or a failed process responsive to an initiation of a second process (e.g., the second process in entry $816_2$) configured to update the plurality of data objects. For instance, coordinator 802 may determine that the second process in entry $816_2$ is ready for execution, coordinator 802 may send a query 801 to metadata service 806 to determine whether the first lock is maintained on behalf of the first process (e.g., the process in entry $816_1$). Metadata service 806 may return a response 803 that specifies whether the first lock is still maintained. Coordinator 802 may also check status field 818 of entry $816_1$ to determine whether the first process is an active process or a failed process.

In response to determining that the first lock is maintained, and the first process is a failed process, flow continues to step 704. Otherwise, flow continues to step 714.

At step 704, the first lock is revoked and a second lock is maintained with respect to the metadata store on behalf of the second process. For example, with reference to FIG. 8, coordinator 802 may send a command 805 to metadata service 806 that causes metadata service 806 to revoke the first lock and obtain and maintain a second lock on a metadata table stored in metadata store 808 that stores the metadata for the data objects that are to be rolled back and subsequently updated by the second process. The second lock is maintained on behalf of the second process. The revoking of the first lock and the obtaining and maintaining of the second lock may occur atomically to guarantee that both the first lock is revoked and the second lock is obtained and maintained.

At step 706, for each of the plurality of data objects, the version number specified for the data object by the metadata stored in the metadata store is compared to the version number of the data object specified in the data store. For example, with reference to FIG. 8, coordinator 802 may send a request 805 to metadata service 806 for the version number of the data object. Metadata service 806 may retrieve the version number from metadata store 808 and provide the version number to coordinator 802 via a response 807. The version number of the data object that is specified in data object store 810 may be obtained from data object store 810 via an API call to data object store 810 issued by coordinator 802. Data object store 810 returns the version number to coordinator 802 in response to receiving the API call.

At step 708, a determination is made as to whether the version number specified for the data object by the metadata matches the version number of the data object specified in the data store. For example, with reference to FIG. 8, coordinator 802 determines whether the version number specified for the data object by the retrieved metadata matches the version number of the data object specified in data object store 810. If the version numbers do not match, flow continues to step 710. Otherwise, flow continues to step 712.

At step 710, the data object is rolled back to a version corresponding to the version number specified for the data object by the metadata. For example, with reference to FIG. 8, coordinator 802 may send a command 809 to data object store 810 that causes the data object to be rolled back to the version corresponding to the version number specified for the data object by that data object's metadata.

At step 712, the data object is maintained. For example, with reference to FIG. 8, because the version numbers match, no further change is required to the data object, and therefore, coordinator 802 does not send a command (i.e., command 809) to data object store 810 to roll back the version of the data object.

At step 714, in response to determining that the first process is an active process, the second process is caused to be suspended until the first process is finished. For example, with reference to FIG. 8, if the status field 818 of entry $816_1$ indicates that the first process is an active process, the second process is suspended until the first process is finished.

III. Example Computer System Implementation

The systems and methods described above in reference to FIGS. 1-8, may be implemented in hardware, or hardware combined with one or both of software and/or firmware. For example, data consistency maintainer 114, data consistency maintainer 202, front end service 210, job queue manager 212, queue 224, compilation serviced 214, token service 216, metadata service 218, coordinator 220, coordinator 402, job queue manager 404, queue 414, metadata service 406, coordinator 602, job queue manager 604, queue 614, coordinator 802, job queue manager 804, queue 814, and metadata service 806, and flowchart 300, flowchart 500, and/or flowchart 700 may be each implemented as computer program code/instructions configured to be executed in one or more processors and stored in a computer readable storage medium. Alternatively, data consistency maintainer 114, data consistency maintainer 202, front end service 210, job queue manager 212, queue 224, compilation serviced 214, token service 216, metadata service 218, coordinator 220, coordinator 402, job queue manager 404, queue 414, metadata service 406, coordinator 602, job queue manager 604, queue 614, coordinator 802, job queue manager 804, queue 814, and metadata service 806, and flowchart 300, flowchart 500, and/or flowchart 700 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
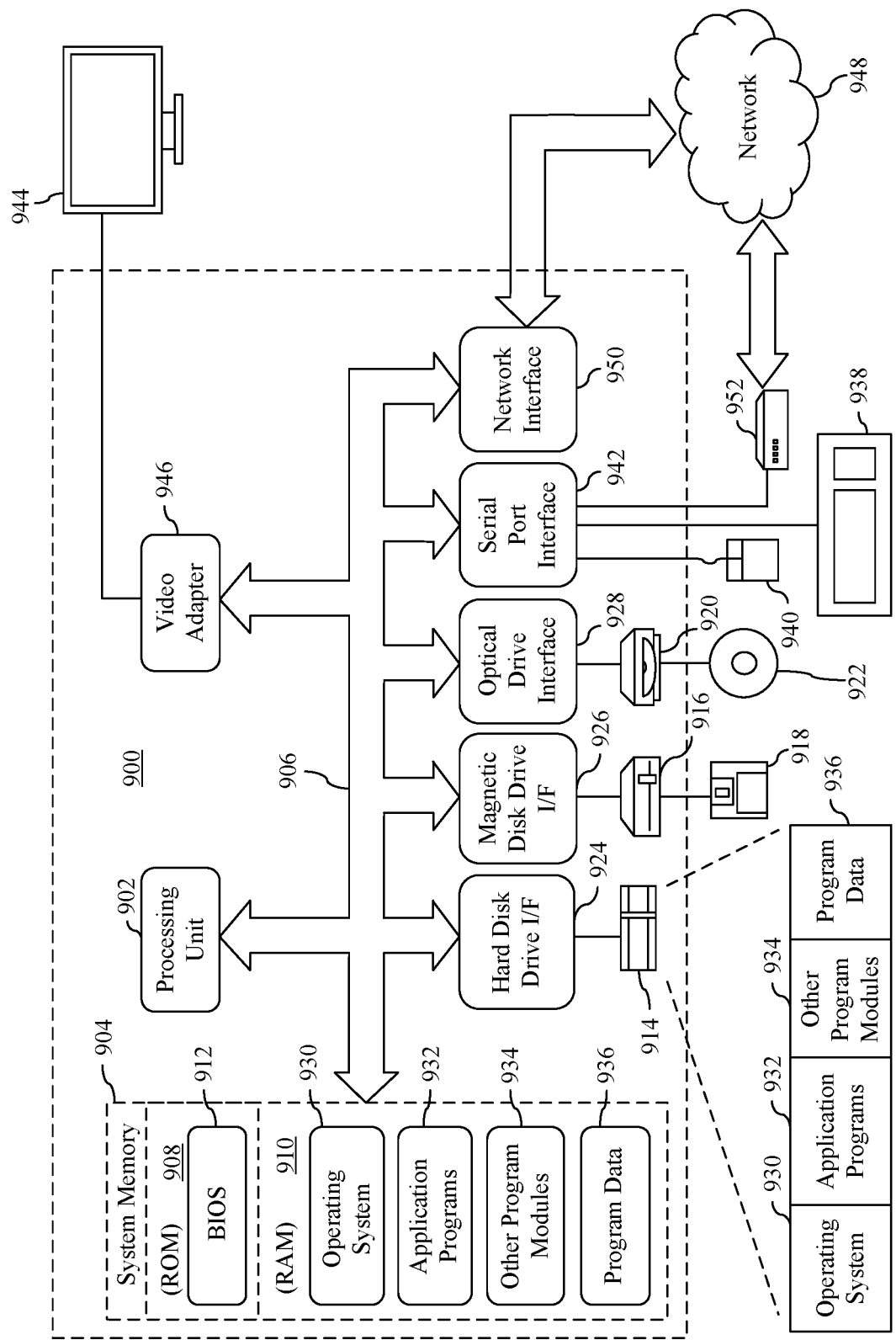
FIG. 9 is a block diagram of an example computing device that may be used to implement embodiments.

Furthermore, FIG. 9 depicts an exemplary implementation of a computing device 900 in which embodiments may be implemented, including server(s) 102, server(s) 104, metadata store 106, data object store 108, server(s) 204, metadata store 206, data object store 208, server(s) 412, metadata store 408, data object store 410, server(s) 612, data object store 610, metadata store 808, data object store 810, data consistency maintainer 114, data consistency maintainer 202, front end service 210, job queue manager 212, queue 224, compilation serviced 214, token service 216, metadata service 218, coordinator 220, coordinator 402, job queue manager 404, queue 414, metadata service 406, coordinator 602, job queue manager 604, queue 614, coordinator 802, job queue manager 804, queue 814, and metadata service 806, and/or each of the components described therein, and flowchart 300, flowchart 500, and/or flowchart 700. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a disk drive 914 for reading from and writing to a hard disk or a solid state drive, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems described above, including the data update and rollback techniques described in reference to FIGS. 1-8.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including system memory 904 of FIG. 9). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Embodiments described herein may also be implemented and/or executed via virtual or emulated hardware (e.g., virtual machines) and/or other environments, including, but not limited to, a cloud-computing based environment (e.g., Microsoft Azure by Microsoft Corporation®).

IV. Additional Exemplary Embodiments

A method for updating a plurality of data objects stored in a data store is described herein. The method includes: maintaining a first lock with respect to a metadata store comprising metadata for the plurality of data objects, the metadata specifying a version number for each of the plurality of data objects, the first lock being maintained on behalf of a first process configured to update the plurality of data objects; opening each of the plurality of data objects stored in the data store; providing an object handle for each of the opened plurality of data objects to one or more first execution units associated with the first process; determining whether each of the plurality of data objects has been successfully updated by the one or more first execution units; and in response to determining that all of the plurality of data objects have been successfully updated: committing the updates to each of the plurality of data objects stored in the data store, a successful commit of an update to a data object of the plurality of data objects causing a version number for that data object specified in the data store to be updated; in response to determining that all commits of the updates to the plurality of data objects have succeeded: obtaining the updated version number from the data store for each of the plurality of data objects; updating the metadata for the plurality of objects to include the updated version number for each of the plurality of data objects; and releasing the first lock on the metadata store; and in response to determining that a commit of the update to at least one of the plurality of data objects has failed, designating the first process as a failed process.

In one embodiment of the foregoing method, the method further comprises: in response to determining that at least one of the plurality of data objects has not successfully updated: initiating at least one second execution unit, the at least one second execution unit being configured to update the at least one of the plurality of data objects that was not successfully updated; and providing a corresponding object handle for the at least one of the plurality of data objects to the at least one second execution unit.

In another embodiment of the foregoing method, each of the one or more first execution units comprises at least one of: one or more processors; or memory.

In a further embodiment of the foregoing method, the first lock on the metadata store and successful commits to corresponding data objects of the plurality of data objects are maintained in response to the commit of the update to the at least one of the plurality of data objects failing.

In yet another embodiment of the foregoing method, the method further comprises: responsive to an initiation of a second process configured to update the plurality of data objects, determining whether the first lock is maintained on behalf of the first process and whether the first process is an active process or a failed process; and in response to determining that the first lock is maintained and the first process is a failed process: revoking the first lock and maintaining a second lock with respect to the metadata store on behalf of the second process; and for each of the plurality of data objects: comparing the version number specified for the data object by the metadata stored in the metadata store to the version number of the data object specified in the data store; determining whether the version number specified for the data object by the metadata matches the version number of the data object specified in the data store; in response to determining that the version number specified for the data object by the metadata does not match the version number of the data object specified in the data store, rolling back the data object to a version corresponding to the version number specified for the data object by the metadata; and in response to determining that the version number specified for the data object by the metadata matches the version number of the data object specified in the data store, maintaining the data object.

In still another embodiment of the foregoing method, the method further comprises: in response to determining that the first process is an active process, causing the second process to be suspended until the first process is finished.

In another embodiment of the foregoing method, said releasing the first lock on the metadata store comprises: determining whether the first lock is still maintained; in response to determining that the first lock is no longer maintained, causing an error message to be issued; and in response to determining that the first lock is still maintained, releasing the first lock.

A computing device is described. The server comprises at least one processor circuit; and at least one memory that stores program code configured to be executed by the at least one processor circuit, the program code comprising: a coordinator configured to: maintain a first lock with respect to a metadata store comprising metadata for the plurality of data objects, the metadata specifying a version number for each of the plurality of data objects, the first lock being maintained on behalf of a first process configured to update the plurality of data objects; open each of the plurality of data objects stored in the data store; provide an object handle for each of the opened plurality of data objects to one or more first execution units associated with the first process; determine whether each of the plurality of data objects has been successfully updated by the one or more first execution units; and in response to a determination that all of the plurality of data objects have been successfully updated: commit the updates to each of the plurality of data objects stored in the data store, a successful commit of an update to a data object of the plurality of data objects causing a version number for that data object specified in the data store to be updated; and in response to a determination that all commits of the updates to the plurality of data objects have succeeded: obtain the updated version number from the data store for each of the plurality of data objects; update the metadata for the plurality of objects to include the updated version number for each of the plurality of data objects; and releasing the first lock on the metadata store; and a manager configured to: in response to determining that a commit of the update to at least one of the plurality of data objects has failed, designating the first process as a failed process.

In one embodiment of the foregoing computing device, in response to a determination that at least one of the plurality of data objects has not successfully updated: initiate at least one second execution unit, the at least one second execution unit being configured to update the at least one of the plurality of data objects that was not successfully updated; and provide a corresponding object handle for the at least one of the plurality of data objects to the at least one second execution unit.

In another embodiment of the foregoing computing device, each of the one or more first execution units comprises at least one of: one or more processors; or memory.

In still another embodiment of the foregoing computing device, the first lock on the metadata store and successful commits to corresponding data objects of the plurality of data objects are maintained in response to the commit of the update to the at least one of the plurality of data objects failing.

In yet another embodiment of the foregoing computing device, the coordinator is further configured to: responsive to an initiation of a second process configured to update the plurality of data objects, determining whether the first lock is maintained on behalf of the first process and whether the first process is an active process or a failed process; and in response to a determination that the first lock is maintained and the first process is an failed process, revoking the first lock and maintaining a second lock with respect to the metadata store on behalf of the second process; and for each of the plurality of data objects: compare the version number specified for the data object by the metadata stored in the metadata store to the version number of the data object specified in the data store; determine whether the version number specified for the data object by the metadata matches the version number of the data object specified in the data store; in response to a determination that the version number specified for the data object by the metadata does not match the version number of the data object specified in the data store, roll back the data object to a version corresponding to the version number specified for the data object by the metadata; and in response to a determination that the version number specified for the data object by the metadata matches the version number of the data object specified in the data store, maintain the data object.

In still another embodiment of the foregoing computing device, the coordinator is further configured to: in response to a determination that the first process is an active process, cause the second process to be suspended until the first process is finished.

In yet another embodiment of the foregoing computing device, the coordinator is configured to release the first lock on the metadata store by: determining whether the first lock is still maintained; in response to determining that the first lock is no longer maintained, causing an error message to be issued; and in response to determining that the first lock is still maintained, releasing the first lock.

A computer-readable storage medium having program instructions recorded thereon that, when executed by at least one processor, perform a method, the method comprising: maintaining a first lock with respect to a metadata store comprising metadata for the plurality of data objects, the metadata specifying a version number for each of the plurality of data objects, the first lock being maintained on behalf of a first process configured to update the plurality of data objects; opening each of the plurality of data objects stored in the data store; providing an object handle for each of the opened plurality of data objects to one or more first execution units associated with the first process; determining whether each of the plurality of data objects has been successfully updated by the one or more first execution units; and in response to determining that all of the plurality of data objects have been successfully updated: committing the updates to each of the plurality of data objects stored in the data store, a successful commit of an update to a data object of the plurality of data objects causing a version number for that data object specified in the data store to be updated; in response to determining that all commits of the updates to the plurality of data objects have succeeded: obtaining the updated version number from the data store for each of the plurality of data objects; updating the metadata for the plurality of objects to include the updated version number for each of the plurality of data objects; and releasing the first lock on the metadata store; and in response to determining that a commit of the update to at least one of the plurality of data objects has failed, designating the first process as a failed process.

In one embodiment of the foregoing computer-readable storage medium, the method further comprises: in response to determining that at least one of the plurality of data objects has not successfully updated: initiating at least one second execution unit, the at least one second execution unit being configured to update the at least one of the plurality of data objects that was not successfully updated; and providing a corresponding object handle for the at least one of the plurality of data objects to the at least one second execution unit.

In another embodiment of the foregoing computer-readable storage medium, each of the one or more first execution units comprises at least one of: one or more processors; or a memory.

In a further embodiment of the foregoing computer-readable storage medium, the first lock on the metadata store and successful commits to corresponding data objects of the plurality of data objects are maintained in response to the commit of the update to the at least one of the plurality of data objects failing.

In yet another embodiment of the foregoing computer-readable storage medium, the method further comprises: responsive to an initiation of a second process configured to update the plurality of data objects, determining whether the first lock is maintained on behalf of the first process and whether the first process is an active process or a failed process; and in response to determining that the first lock is maintained and the first process is a failed process, revoking the first lock and maintaining a second lock with respect to the metadata store on behalf of the second process; and for each of the plurality of data objects: comparing the version number specified for the data object by the metadata stored in the metadata store to the version number of the data object specified in the data store; determining whether the version number specified for the data object by the metadata matches the version number of the data object specified in the data store; in response to determining that the version number specified for the data object by the metadata does not match the version number of the data object specified in the data store, rolling back the data object to a version corresponding to the version number specified for the data object by the metadata; and in response to determining that the version number specified for the data object by the metadata matches the version number of the data object specified in the data store, maintaining the data object.

In still another embodiment of the foregoing computer-readable storage medium, the method further comprises: in response to determining that the first process is an active process, causing the second process to be suspended until the first process is finished.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for updating a plurality of data objects stored in a data store, comprising:
    maintaining a first lock with respect to a metadata store comprising metadata for the plurality of data objects, the metadata specifying a version number for each of the plurality of data objects, the first lock being maintained on behalf of a first process configured to update the plurality of data objects;
    opening each of the plurality of data objects stored in the data store;
    providing an object handle for each of the opened plurality of data objects to one or more compute resources allocated for the first process;
    determining whether each of the plurality of data objects has been successfully updated by the one or more allocated compute resources; and
    in response to determining that all of the plurality of data objects have been successfully updated:
        committing the updates to each of the plurality of data objects stored in the data store, a successful commit of an update to a data object of the plurality of data objects causing a version number for that data object specified in the data store to be updated;
        in response to determining that all commits of the updates to the plurality of data objects have succeeded:
            obtaining the updated version number from the data store for each of the plurality of data objects;
            updating the metadata for the plurality of objects to include the updated version number for each of the plurality of data objects; and
            releasing the first lock on the metadata store; and
        in response to determining that a commit of the update to at least one of the plurality of data objects has failed, designating the first process as a failed process, the first lock on the metadata store and successful commits to corresponding data objects of the plurality of data objects being maintained in response to the commit of the update to the at least one of the plurality of data objects failing.

2. The method of claim 1, further comprising:
    in response to determining that at least one of the plurality of data objects has not successfully updated:
        allocating at least one second compute resource, the at least one second compute resource being configured to update the at least one of the plurality of data objects that was not successfully updated; and
        providing a corresponding object handle for the at least one of the plurality of data objects to the at least one second compute resource.

3. The method of claim 1, wherein each of the one or more first compute resources comprises at least one of:
    one or more processors; or
    memory.

4. The method of claim 1, further comprising:
    responsive to an initiation of a second process configured to update the plurality of data objects, determining whether the first lock is maintained on behalf of the first process and whether the first process is an active process or a failed process; and
    in response to determining that the first lock is maintained and the first process is a failed process:
        revoking the first lock and maintaining a second lock with respect to the metadata store on behalf of the second process; and
        for each of the plurality of data objects:
            comparing the version number specified for the data object by the metadata stored in the metadata store to the version number of the data object specified in the data store;
            determining whether the version number specified for the data object by the metadata matches the version number of the data object specified in the data store;
            in response to determining that the version number specified for the data object by the metadata does not match the version number of the data object specified in the data store, rolling back the data object to a version corresponding to the version number specified for the data object by the metadata; and
            in response to determining that the version number specified for the data object by the metadata matches the version number of the data object specified in the data store, maintaining the data object.

5. The method of claim 4, further comprising:
    in response to determining that the first process is an active process, causing the second process to be suspended until the first process is finished.

6. The method of claim 1, wherein releasing the first lock on the metadata store comprises:
    determining whether the first lock is still maintained;
    in response to determining that the first lock is no longer maintained, causing an error message to be issued; and
    in response to determining that the first lock is still maintained, releasing the first lock.

7. The method of claim 1, wherein the metadata further specifies an identifier of a table stored in the data store in which each of the plurality of data objects is located.

8. A computing device, comprising:
    at least one processor circuit; and
    at least one memory that stores program code configured to be executed by the at least one processor circuit, the program code comprising:

a coordinator configured to:
  maintain a first lock with respect to a metadata store comprising metadata for the plurality of data objects, the metadata specifying a version number for each of the plurality of data objects, the first lock being maintained on behalf of a first process configured to update the plurality of data objects;
  open each of the plurality of data objects stored in the data store;
  provide an object handle for each of the opened plurality of data objects to one or more compute resources allocated for the first process;
  determine whether each of the plurality of data objects has been successfully updated by the one or more allocated compute resources; and
  in response to a determination that all of the plurality of data objects have been successfully updated:
    commit the updates to each of the plurality of data objects stored in the data store, a successful commit of an update to a data object of the plurality of data objects causing a version number for that data object specified in the data store to be updated; and
    in response to a determination that all commits of the updates to the plurality of data objects have succeeded:
      obtain the updated version number from the data store for each of the plurality of data objects;
      update the metadata for the plurality of objects to include the updated version number for each of the plurality of data objects; and
      releasing the first lock on the metadata store; and
a manager configured to:
  in response to determining that a commit of the update to at least one of the plurality of data objects has failed, designating the first process as a failed process, the first lock on the metadata store and successful commits to corresponding data objects of the plurality of data objects being maintained in response to the commit of the update to the at least one of the plurality of data objects failing.

9. The server of claim 8, wherein the coordinator is further configured to:
in response to a determination that at least one of the plurality of data objects has not successfully updated:
  allocate at least one second compute resource, the at least one second compute resource being configured to update the at least one of the plurality of data objects that was not successfully updated; and
  provide a corresponding object handle for the at least one of the plurality of data objects to the at least one second compute resource.

10. The server of claim 8, wherein each of the one or more first compute resources comprises at least one of:
one or more processors; or
memory.

11. The server of claim 8, wherein the coordinator is further configured to:
responsive to an initiation of a second process configured to update the plurality of data objects, determining whether the first lock is maintained on behalf of the first process and whether the first process is an active process or a failed process; and
in response to a determination that the first lock is maintained and the first process is a failed process:
  revoking the first lock and maintaining a second lock with respect to the metadata store on behalf of the second process; and
  for each of the plurality of data objects:
    compare the version number specified for the data object by the metadata stored in the metadata store to the version number of the data object specified in the data store;
    determine whether the version number specified for the data object by the metadata matches the version number of the data object specified in the data store;
    in response to a determination that the version number specified for the data object by the metadata does not match the version number of the data object specified in the data store, roll back the data object to a version corresponding to the version number specified for the data object by the metadata; and
    in response to a determination that the version number specified for the data object by the metadata matches the version number of the data object specified in the data store, maintain the data object.

12. The server of claim 11, wherein the coordinator is further configured to:
in response to a determination that the first process is an active process, cause the second process to be suspended until the first process is finished.

13. The server of claim 8, wherein the coordinator is configured to release the first lock on the metadata store by:
determining whether the first lock is still maintained;
in response to determining that the first lock is no longer maintained, causing an error message to be issued; and
in response to determining that the first lock is still maintained, releasing the first lock.

14. The computing device of claim 8, wherein the metadata further specifies an identifier of a table stored in the data store in which each of the plurality of data objects is located.

15. A computer-readable storage medium having program instructions recorded thereon that, when executed by at least one processor, perform a method, the method comprising:
maintaining a first lock with respect to a metadata store comprising metadata for the plurality of data objects, the metadata specifying a version number for each of the plurality of data objects, the first lock being maintained on behalf of a first process configured to update the plurality of data objects;
opening each of the plurality of data objects stored in the data store;
providing an object handle for each of the opened plurality of data objects to one or more compute resources allocated for the first process;
determining whether each of the plurality of data objects has been successfully updated by the one or more allocated compute resources; and
in response to determining that all of the plurality of data objects have been successfully updated:
  committing the updates to each of the plurality of data objects stored in the data store, a successful commit of an update to a data object of the plurality of data objects causing a version number for that data object specified in the data store to be updated;
  in response to determining that all commits of the updates to the plurality of data objects have succeeded:

obtaining the updated version number from the data store for each of the plurality of data objects;

updating the metadata for the plurality of objects to include the updated version number for each of the plurality of data objects; and releasing the first lock on the metadata store; and in response to determining that a commit of the update to at least one of the plurality of data objects has failed, designating the first process as a failed process, the first lock on the metadata store and successful commits to corresponding data objects of the plurality of data objects being maintained in response to the commit of the update to the at least one of the plurality of data objects failing.

16. The computer-readable storage medium of claim 15, the method further comprising:

in response to determining that at least one of the plurality of data objects has not successfully updated:

allocating at least one second compute resource, the at least one second compute resource being configured to update the at least one of the plurality of data objects that was not successfully updated; and providing a corresponding object handle for the at least one of the plurality of data objects to the at least one second compute resource.

17. The computer-readable storage medium of claim 15, wherein each of the one or more first compute resources comprises at least one of:

one or more processors; or a memory.

18. The computer-readable storage medium of claim 15, the method further comprising:

responsive to an initiation of a second process configured to update the plurality of data objects, determining whether the first lock is maintained on behalf of the first process and whether the first process is an active process or a failed process; and in response to determining that the first lock is maintained and the first process is a failed process:

revoking the first lock and maintaining a second lock with respect to the metadata store on behalf of the second process; and for each of the plurality of data objects:

comparing the version number specified for the data object by the metadata stored in the metadata store to the version number of the data object specified in the data store;

determining whether the version number specified for the data object by the metadata matches the version number of the data object specified in the data store;

in response to determining that the version number specified for the data object by the metadata does not match the version number of the data object specified in the data store, rolling back the data object to a version corresponding to the version number specified for the data object by the metadata; and in response to determining that the version number specified for the data object by the metadata matches the version number of the data object specified in the data store, maintaining the data object.

19. The computer-readable storage medium of claim 18, the method further comprising:

in response to determining that the first process is an active process, causing the second process to be suspended until the first process is finished.

20. The computer-readable storage medium of claim 15, wherein the metadata further specifies an identifier of a table stored in the data store in which each of the plurality of data objects is located.

* * * * *